2,703,176

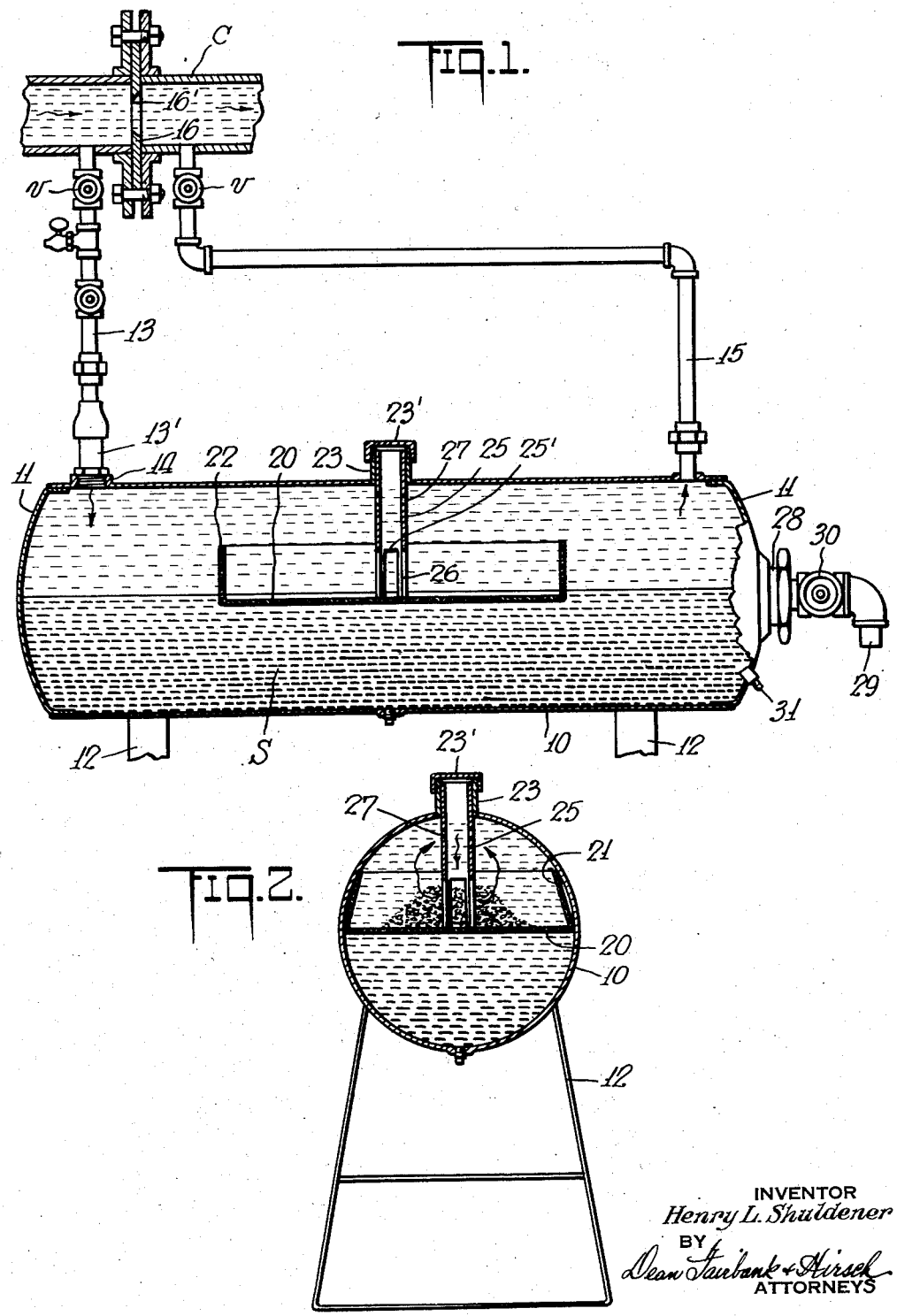

PROTECTIVE EQUIPMENT AND METHOD FOR WATER RECIRCULATING SYSTEMS

Henry L. Shuldener, Scarsdale, N. Y., assignor to Water Service Laboratories, Inc., New York, N. Y., a corporation of New York Application August 28, 1950, Serial No. 181,715

3 Claims. (Cl. 210—31)

The present invention is concerned with systems for re-circulating water, more especially of the type useful in connection with air conditioning or hot water circulating heating systems.

The re-circulating water systems employed in air conditioning operation, bring the water into intimate contact with the air at the cooling towers, evaporative condensers, air washers or spray chambers thereof, so that not only is oxygen and carbon dioxide constantly absorbed from the air to increase the content of these gases that is naturally present in tap water, but more especially in industrial areas, the water absorbs sulphur dioxide and other acid-forming air borne impurities present in the flue gases discharged from smoke stacks. In many instances the re-circulating water absorbs enough of such acid-forming gases to bring its pH to 6 or even as low as 4 or lower, with corrosive effects that are aggravated by the fact that with lowering of the pH, the oxygen attack also becomes more intense. The air conditioning equipment with which the circulating water comes into engagement is thus subject to various degrees of attack, depending upon the metals used, especially for those surfaces that do not admit of protection under service conditions by corroson resistant paints, and more especially is this true of the cooling towers, spray ponds, evaporative condensers, air washers or spray chambers, the interconnecting piping, condenser tubes and the various other component metallic parts thereof exposed to water flow in open re-circulating air conditioning systems as well as of various component elements of closed circulating water systems. The difficulty may be aggravated due to galvanic action between dissimilar metals or at soldered joints used in the assembly.

It is among the objects of the invention to provide a method and simple and compact equipment for executing the same with a minimum of expense and inconvenience, that serves to protect an otherwise conventional water re-circulating system or installation, by constantly maintaining the water flowing therethrough substantially alkaline and non-corrosive and to maintain on all metal surfaces engaged by the circulating water a corresion resistant film substantially to insure that the entire system remains immune to the chemical effect of corrosion and furthermore that the valves and spray openings of the system are insured against becoming clogged by the accumulated product of such corrosion.

In the accompanying drawings in which is shown one or more of various possible embodiments of the several features of the invention, Fig. 1 is a view in longitudinal cross section of a preferred form of the equipment embodying the present invention, and shown with desired solution at relatively high level, and Fig. 2 is a transverse sectional view thereof showing the chemical partly dissolved.

Referring to the drawings, the equipment comprises a tank, illustratively a steel tank constituting a horizontal cylindrical drum 10 with end heads 11 welded thereto and desirably mounted upon a suitable cradle 12. The tank is associated with any conventional system for re-circulating water such as an air conditioning or a hot water circulating heating system, the details of which need not and are not shown, except for a small section C of the conduit through which the water is re-circulated. From that small section a small proportion of the circulating water is shunted through the tank 10 by means of an inlet shunting pipe 13 connected to a spud 14 at the upper part of the tank near one end thereof and a return shunting pipe 15 similarly connected to the tank near the opposite end thereof, the required difference in pressure potential to ensure flow through the tank 10 being secured by a disk 16 with a knife edge orifice 16' interposed in the circulating system C between the inlet shunting pipe 13 and the return shunting pipe 15.

The tank 10 contains a heavier solution S in the lower half thereof, of chemical properties such, that when entrained in small proportions by the water passing thereover by shunt flow from the main stream, it will neutralize the acidity of the water and will also maintain a protective film on the metal surfaces of the circulating system engaged by water and thereby protect these metal parts against corrosion due to gases such as carbon dioxide or sulphur dioxide carried by the water and which are picked up in the cooling towers, evaporative condensers, air washers or spray chambers from the atmosphere, the sulphur dioxide originating from flue gases especially in industrial areas.

The chemical commonly used in practicing the invention is a mixture of caustic, preferably sodium hydroxide and a chromate, preferably sodium dichromate. Use of the latter is feasible despite its toxicity since the water is not for domestic use. The sodium hydroxide is released into the stream in proportions such as to neutralize the acid forming gases and the chromate in proportion such as to maintain the desired film on the metal surface of the equipment, and so protects against the corrosive effect of the gases carried by the water and also protects against corrosion due to electrolytic action at any joints in the re-circulating system that include diverse metals or solder connections.

According to one feature of the invention, the chemical, desirably a mixture of sodium hydroxide and sodium dichromate, as mentioned, is introduced into the tank as a comminuted solid, either in crystalline form or in dehydrated powdered form. The tank is so constructed as to facilitate the ready solution of this solid chemical therein and to afford the desired heavier layer S of solution above referred to in the lower half of the tank. To this end the tank is provided with a screen 20, desirably extending horizontally, as shown, preferably midway between the lower and upper part of the tank. That screen, for convenience, may be of metal mesh and is desirably in the form of a basket with upstanding side walls 21 bent inward at such angle that the upper edges thereof engage the wall of the tank and are there welded in place, as best shown in Fig. 2, the screen having end walls 22, upstanding therefrom and desirably at a substantial distance from the end heads of the tank, as shown.

The screen is preferably of very fine mesh, such that the solid chemical when introduced through charging opening 23, that is desirably a neck which rises slightly from the top of the tank will intercept any chemical that has not dissolved by the time it reaches the screen and this may occur when the chemical is poured in fast. Both the water below and that above the screen is thus in wetting engagement with the solid chemical intercepted by the screen. The aqueous solution of the highly water-soluble solid has a substantially higher specific gravity than the water, so that the solution promptly sinks to the bottom of the water-charged tank through the meshes of the screen and the lighter water thus displaced upwardly from the lower part of the tank coming in contact with the solid chemical, the resultant solution flows to the bottom. This circulation continues until the solid has been completely dissolved, which takes but a few minutes.

In view of the fact that sodium dichromate is highly soluble in cold water (180 parts in 100 parts of water) and sodium hydroxide likewise is very soluble, it is feasible rapidly to dissolve in unheated tap water within the tank about 25 per cent by weight of the total water content of the tank, thereby to afford a solution considerably heavier than water, which solution fills only about the lower half of the tank and yet the solution is so far below the saturation point that there is no danger of crystallization with drop in temperature. The solution in the freshly charged tank preferably extends to a level in the vicinity of and slightly above screen 20 with little of the chemical thereabove and it remains stationary in the tank without substantial diffusion during periods of normal idleness of the system.

In one specific typical application, shown for purposes of illustration merely, a tank of eighteen (18) gallons capacity and twelve (12) inches inner diameter would be charged with 16.2 pounds of crystal sodium dichromate and 24.3 pounds of crystal sodium hydroxide. The completely dissolved chemical in that case will form a heavier layer filling the lower half and having a specific gravity of 1.34 at the test cock 31 which is not materially less for some inches thereabove. The specific gravity is 1.075 one inch above the mid section and 1.0 two inches above the mid section. The solution is thus of progressively decreasing specific gravity from the maximum at the bottom of the tank to substantially plain water 8 inches above the bottom.

With the use of the specific installation described, for a typical re-circulating system, in which the water is circulated at the rate of 500 gallons per minute, the main stream of re-circulating water will entrain about 300 parts per million of sodium dichromate and a sufficient proportion of sodium hydroxide to maintain the water slightly alkaline at a pH of 7.5 to 9.5. This specific installation is useful, however, for any air conditioning system that circulates water at a rate between 300 and 900 gallons per minute, in order to entrain the sodium chromate in the main water stream at a rate between 200 and 600 parts per million. For the higher rate of consumption, the system will of course be serviced at shorter intervals than for the lower rate. Air conditioning systems with greater rate of water circulation would be equipped with two or more of the installations described or with only one such installation of greater volume and correspondingly larger amount of chemical and the amount of sodium hydroxide would be calibrated in each case according to requirements in order to maintain the water within the desired pH range of 7.5 to 9.5.

While in general such refinement is not required for present purposes, it is preferable so to select the diameter of the lower part 13' of the inlet shunt pipe 13 as to cause a linear velocity of the impinging liquid stream to effect chemical turbulence near the surface of the solution therebelow sufficient to effect the desired pick-up rate per unit volume rate of said stream.

The invention in a preferred embodiment involves a safeguard to preclude spread of any material portion of chemical solution into the upper half of the tank 10, since the presence of substantial amount of chemical in solution at such upper part of the tank might result in considerable waste by delivery of an excessive amount of chemical with the circulating water through the system to be protected. To this end there may be introduced into the upstanding charging opening 23 which is normally closed by removable cap 23', a short section of tube 25, having one or more extension fingers 26 at the lower end thereof to serve as a rest upon the screen 20 so as to maintain the lower edge 25' of the tube 25 spaced from the screen, thereby to permit spread of the solid chemical from the tube over the screen 20. Moreover this tube desirably has one or more apertures 27 therein near the upper part of the tank 10. As solid chemical is poured through this tube 25 and becomes partly dissolved by contact of water therewith, the downward flow of the heavy solution through screen 20 will effect circulation to draw water from the upper part of the tank through apertures 27, as shown by arrows in Fig. 2, so that at most negligible amounts of the solution will enter the tank above the screen 10.

Chemical must be replenished from time to time even though it is not volatile in character, because there will be a loss due to windage, pump gland leakage, overflow from pans and blow-down. Accordingly, with a chemical content illustratively of 40 pounds in the freshly charged tank, as much as 4 pounds may be lost each day. The tank above described and any tank used is desirably of such size that when freshly charged with solution filling the lower half thereof, it will require re-charging at intervals of not less than one week of operation in continuous service. Desirably means is provided above the level of the chemical solution for drawing off enough water from the tank 10 preparatory to re-charging to afford room for the solid chemical to be introduced. For this purpose, the large spud 28 in one of the heads, which when removed, permits access to the interior of the tank 10 for cleaning, carries a drain 29 controlled by valve 30 by the opening of which sufficient water may be drained off for the purpose set forth after the tank has been shut off from the main circulating system by closing valves v. The test-cock 31 near the lower part of the tank serves for access to the solution, for the purpose of determining its specific gravity, thereby to enable the service man immediately to determine how much chemical remains in the tank and therefore how much solid chemical to add in order to bring the solution to be formed to the desired level, that is, preferably to slightly above the mid section of the tank.

By the present invention, if a supply of chemical is kept in the tank at all times, complete assurance is had against corrosion of the metal surfaces of the re-circulating system, and against clogging of spray openings or the like, due to accumulation of products of corrosion therein.

Since the equipment of the present invention affords not only an automatic proportioning feed for adding chemical to the re-circulating water in the manner required, but also serves to dissolve the chemical added in solid form, in order automatically to furnish the desired solution, considerable economy is effected from a service standpoint. Only a small fraction of the bulk and weight of material need be stored, transported or handled by the service staff as compared with the use of previously prepared aqueous solution of the chemical. Moreover, in the handling of the crystalline or powdered solid, no danger of leakage is incurred and in fact cartons rather than water-tight tanks, may be used as storage or handling containers for the chemical. In practice a standardized mix of sodium dichromate and sodium hydroxide may be used to meet the average condition, which may readily be adjusted to meet special requirements where a somewhat greater proportion of one chemical or the other is called for.

The tank 10 thus constitutes a relatively stagnant pool associated with, but isolated from the main liquid stream of the circulating system, from the surface of the heavier chemical solution in the bottom of which tank small proportions of chemical are entrained by proportional feed in shunt flow with respect to the main stream. In charging, the solid chemical intercepted by the screen when dropped through the charging opening is promptly and automatically dissolved by the flow of water engendered in the tank as the heavier solution of dissolved chemical sinks to the bottom of the tank and causes the displaced water to flow upward and thence over the solid chemical until the latter has been completely dissolved.

As many changes could be made in the above method and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. Equipment for constantly protecting the metal surfaces of a water re-circulating system from the corrosive effect of gases dissolved in the water, which comprises a tank having an inlet from and an outlet to the circulating system, said tank having a charging opening between the inlet and the outlet thereof, said tank having therein a substantially horizontal perforated screen substantially above the lower part of the tank for intercepting comminuted solid chemical introduced through the charging opening, said screen being directly under the charging opening and having perforated end portions extending across the width of the tank and spaced from the respective ends of the tank by distances substantially greater than the inlet and outlet respectively, whereby the comminuted solid chemical is out of the direct stream flow.

2. Treating equipment for a water re-circulating system for the purpose of entraining chemical in the circulating water to maintain a constant protective film on the metal surfaces engaged by the circulating water, said equipment comprising a tank having inlet and outlet connections to the circulating system, and having a charging opening between said connections, said tank having a generally horizontal screen therein near the mid section to intercept comminuted solid chemical introduced into the tank and to permit the chemical to pass therethrough thereof, directly below the charging opening and serving as it dissolves with the heavier solution of such chemical largely in the portion of said tank below said screen, said screen being directly under the charging opening and having perforated end portions extending across the width of the tank and spaced from the respective ends of the tank by distances substantially greater than the inlet and outlet respectively, whereby the comminuted solid chemical is out of the direct stream flow.

3. Treating equipment for the water of a recirculating system constantly to protect the metal surfaces engaged by the water from the corrosive effect of gases dissolved in the water, comprising a tank having a charging opening and inlet and outlet connections to the re-circulating system, said tank having affixed therein a generally horizontal screen near the mid section thereof, said screen being in the form of a basket directly below the charging opening and serving to intercept comminuted solid water soluble protective chemical introduced through said charging opening and through which the solution of such chemical will pass to lodge in the lower part of the tank for slow entrainment therefrom with water by-passed from the re-circulating system over the surface of such heavier dissolved liquid, the ends of the screen basket being spaced from the respective ends of the tank by distances substantially greater than the respective inlet and outlet connections, whereby the comminuted solid chemical is out of the direct stream flow, a tube extending downward from the charging opening, with the major portion of its lower edge well above the screen for isolating the solid chemical introduced into the tank from the body of water above the screen, with one or more perforations in the wall of said tube, so that water from the upper portion of the tank entrained through such aperture with the downward movement of the chemical assures the settling of the solution substantially solely in the lower portion of the tank.

References Cited in the file of this patent

UNITED STATES PATENTS

| Number | Name | Date |
|---|---|---|
| 888,469 | Case et al. | May 26, 1908 |
| 1,427,545 | Orr | Aug. 29, 1922 |
| 1,692,706 | Sealey | Nov. 20, 1928 |
| 1,796,407 | Shuldener | Mar. 17, 1931 |
| 2,064,627 | Paine | Dec. 15, 1936 |
| 2,126,430 | Unger | Aug. 9, 1938 |
| 2,137,755 | Glynn | Nov. 22, 1938 |
| 2,192,736 | Earl | Mar. 5, 1940 |
| 2,299,748 | Hatch | Oct. 27, 1942 |
| 2,532,973 | Wallentin et al. | Dec. 5, 1950 |

FOREIGN PATENTS

| Number | Country | Date |
|---|---|---|
| 19,378 | Great Britain | of 1905 |